(12) United States Patent
Orthmann

(10) Patent No.: US 9,046,033 B2
(45) Date of Patent: Jun. 2, 2015

(54) COMBUSTION ENGINE

(71) Applicant: Christopher Bradley Orthmann, Cape Coral, FL (US)

(72) Inventor: Christopher Bradley Orthmann, Cape Coral, FL (US)

( * ) Notice: Subject to any disclaimer, the term of this patent is extended or adjusted under 35 U.S.C. 154(b) by 49 days.

(21) Appl. No.: 13/729,116

(22) Filed: Dec. 28, 2012

(65) Prior Publication Data

US 2014/0182527 A1 Jul. 3, 2014

(51) Int. Cl.
| | |
|---|---|
| *F02B 53/00* | (2006.01) |
| *F01C 3/00* | (2006.01) |
| *F02B 55/14* | (2006.01) |
| *F01C 1/22* | (2006.01) |

(52) U.S. Cl.
CPC ............... *F02B 53/00* (2013.01); *F02B 55/14* (2013.01); *F01C 1/22* (2013.01); *Y02T 10/17* (2013.01)

(58) Field of Classification Search
USPC .............................................. 123/241; 418/68
See application file for complete search history.

(56) References Cited

U.S. PATENT DOCUMENTS

| | | | | |
|---|---|---|---|---|
| 7,751 | A | * | 11/1850 | Davis |
| 41,327 | A | * | 1/1864 | Edson et al. |
| 570,584 | A | | 11/1896 | White |
| 1,890,612 | A | * | 12/1932 | Kempthorne |
| 2,204,760 | A | * | 6/1940 | Jensen |
| 2,816,527 | A | * | 12/1957 | Palazzo ........................ 123/245 |
| 3,858,560 | A | * | 1/1975 | Harrington ..................... 418/36 |
| 4,401,070 | A | | 8/1983 | McCann |
| 5,127,810 | A | * | 7/1992 | Kolbinger |
| 5,404,849 | A | * | 4/1995 | Fenton |
| 5,429,084 | A | | 7/1995 | Cherry et al. |
| 5,537,973 | A | * | 7/1996 | Wittry ........................... 123/245 |
| 5,540,199 | A | | 7/1996 | Penn |
| 6,550,443 | B1 | | 4/2003 | Vanmoor |
| 6,626,643 | B2 | * | 9/2003 | Staudenrausch |
| 6,659,067 | B1 | | 12/2003 | Al-Hawaj |
| 6,772,728 | B2 | | 8/2004 | Al-hawaj |
| 6,941,900 | B1 | * | 9/2005 | Malinov |
| 6,962,137 | B2 | * | 11/2005 | Udy |
| 7,441,534 | B2 | * | 10/2008 | Bastian |
| 8,056,529 | B2 | | 11/2011 | Qamhiyeh |
| 8,230,836 | B2 | * | 7/2012 | Kamenov |
| 2010/0251991 | A1 | | 10/2010 | Drachko |

* cited by examiner

*Primary Examiner* — Thai Ba Trieu
*Assistant Examiner* — Ngoc T Nguyen
(74) *Attorney, Agent, or Firm* — George F. Wallace

(57) ABSTRACT

A combustion engine can include an engine block having interior and exterior block surfaces and a combustion generating system connected thereto, with the inner block surface defining a cavity therein; an exhaust port between the inner and exterior block surfaces; a crankshaft rotatably fixed within the cavity and configured to rotate around an axis; and leading and trailing blades connected to the crankshaft. During a combustion event, the inner block surface is complementarily shaped to the leading and trailing blades, such that the inner block surface is outside the blades' ranges of travel. A combustion generating system can supply and ignite an air fuel composition to create a combustion force positioned closer to one of the blades, forcing the one of the blades to rotate away from the combustion force, which rotates the crankshaft around the axis.

29 Claims, 3 Drawing Sheets

COMBUSTION ENGINE

FIELD OF THE INVENTION

The present invention relates to combustion engines.

BACKGROUND OF THE INVENTION

Internal combustion engines can generate energy by harnessing combustion forces arising from the ignition of an air-fuel mixture. By igniting such a mixture within an at least substantially closed chamber, a combustion force can cause mechanical motion, which can then be transferred, used or transformed as power. A typical system can include linear motion of a piston and eventual rotation of a crankshaft via mechanical connection between the piston and the crankshaft.

SUMMARY OF THE INVENTION

It is, therefore, an object of the present invention to provide a combustion engine. It is another object of the present invention to provide a method of producing energy from a combustion engine and a method of servicing the same.

An exemplary environment of the present invention can include, but is not limited to, a motor vehicle, a marine vessel, an aeronautical craft, and any other environment in which energy produced via combustion forces is desired.

In an exemplary embodiment of the present invention, a combustion engine can include an engine block; an exhaust port; a crankshaft; a leading blade; and a trailing blade.

In an exemplary aspect, an engine block can include a combustion generating system connected thereto, an exterior block surface, and an inner block surface, with the inner block surface defining a cavity within the engine block.

In further exemplary aspects, an exhaust port can extend between the inner block surface and the exterior block surface, and a combustion port can extend between the inner block surface and the exterior block surface, at the location of the combustion generating system.

In a further exemplary aspect of the present invention, a crankshaft can be rotatably fixed within the cavity and configured to rotate around an axis.

In yet another exemplary aspect, a leading blade can be connected to the crankshaft, and can have one of a leading blade arced edge and a leading blade straight edge, a leading blade wall, and a leading blade range of travel that is coaxial with the crankshaft.

In still yet another exemplary aspect, a trailing blade can be connected to the crankshaft, and can have one of a trailing blade arced edge and a trailing blade straight edge, a trailing blade wall, and a trailing blade range of travel that is coaxial with the crankshaft.

An exemplary material for any portion of the present invention can include, but is not limited to, one or more of the following: a metal, a ceramic, steel, aluminum, cast iron, a metallic amalgam, and any other material that can withstand high temperatures but also maintain high tensile strength.

The following are additional exemplary aspects of the present invention during a combustion event:

A portion of the inner block surface can be complementarily shaped to the leading and trailing blade edges, such that the portion of the inner block surface is outside the ranges of travel by at most six (6) inches, such that the leading and trailing blade walls form, in conjunction with the inner block surface, a combustion chamber.

The combustion generating system can supply and ignite an amount of air fuel composition at the location within the combustion chamber via the combustion port to create a combustion force positioned closer to one of the leading blade wall and the trailing blade wall than the other of the leading blade wall and trailing blade wall. The combustion force can force either the leading blade or the trailing blade wall to rotate away from the combustion force, which can rotate the crankshaft around the axis with the force exhausting from the combustion chamber via the exhaust port.

The following are additional and/or exemplary aspects, one or more of which can be combined with the basic invention as embodied above:

The engine block can have an exterior block surface and an inner block surface, with the inner block surface defining a cavity within the engine block. The cavity can be symmetrically-shaped, asymmetrically-shaped, and/or cylindrically-shaped, in whole or in part, along an axis. The cavity surface can be smooth and/or have a consistent or random pattern, in whole or in part, in the material.

The combustion port can extend along a vector from the axis. The combustion port can also be fixedly connected to the combustion generating system. The combustion port can also be movably connected to the combustion generating system.

The exhaust port can also include a cover fixed to the engine block and/or the exterior block surface.

The crankshaft can be configured to rotate around an axis in at least one of a clockwise or counterclockwise direction.

A leading blade can include a leading blade straight edge and/or a leading blade arced edge, with a portion of the inner block surface complementarily shaped to the straight edge and/or the arced edge. At least a portion of the leading blade arced edged can be uniformly arced or irregularly arced. At least a portion of a leading blade wall can be flat, concave, convex or irregularly shaped.

A trailing blade can include a trailing blade straight edge and/or a trailing blade arced edge, with a portion of the inner block surface complementarily shaped to the straight edge and/or the arced edge. At least a portion of the trailing blade arced edge can be uniformly arced or irregularly arced. At least a portion of the trailing blade wall can be flat, concave, convex or irregularly shaped.

A combustion generating system can include an air-fuel delivery sub-system and a spark generating sub-system. At least a portion of the combustion generating system can be connected to the inner block surface via a combustion port, which can extend between the exterior block surface and the inner block surface.

A combustion force can be positioned closer to the leading blade wall than the trailing blade wall and/or closer to the trailing blade wall than the leading blade wall.

Additional exemplary embodiments include methods of producing energy with any embodiment of a combustion engine described herein; and a method of servicing any embodiment of a combustion engine described herein, where at least one of an engine block, a crankshaft, a leading blade, a trailing blade, an air fuel delivery sub-system and a spark generating sub-system are serviced. Servicing can include, but is not limited to, tuning, general maintenance, repair, modification and/or replacement in whole or in part.

These and other exemplary aspects of the present invention are described herein

BRIEF DESCRIPTION OF THE DRAWINGS

The present invention is illustrated by way of example, and not in limitation, in the figures of the accompanying drawings.

DETAILED DESCRIPTION OF THE INVENTION

The present invention will now be described in more detail by way of example with reference to the embodiments shown in the accompanying figures. It should be kept in mind that the following described embodiments are only presented by way of example and should not be construed as limiting the inventive concept to any particular physical configuration, material, or order.

Figure 1:
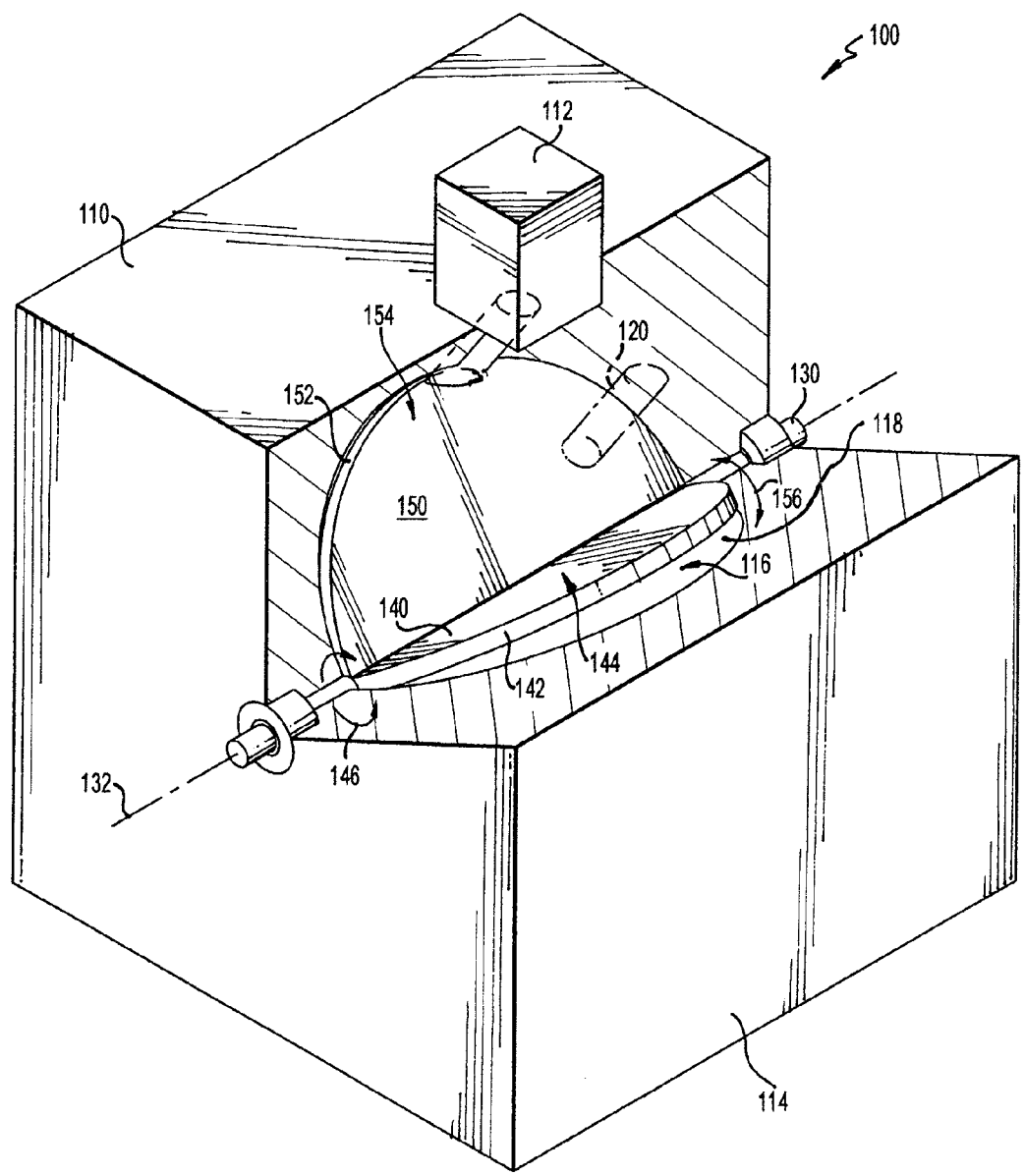
FIG. 1 illustrates an exemplary embodiment of the present invention, in which a combustion engine includes an engine block, an exhaust port, a crankshaft, a leading blade and a trailing blade.

FIG. 1 illustrates one exemplary embodiment of the present invention, in which a combustion engine 100 includes an engine block 110, an exhaust port 120, a crankshaft 130, a leading blade 140 and a trailing blade 150.

As illustrated, engine block 110 can have an exterior block surface 114 and inner block surface 116, the inner block surface 116 defining a cavity 118. It should be noted, that engine block 110 is illustratively shown as having a cubic shape, but any other functionally compatible shape can be provided. For example, engine block 110 can be spherical, cylindrical, rhomboidal, or conical. Furthermore, it should be noted that engine block 110 is illustratively shown as a single engine block 110, but multiple blocks may be configured to function together or opposite from one another to create the desired combustion engine 100 configuration. Engine block 110 and all other components described herein can be formed from materials that are rigid, have a high tensile strength and able to withstand high temperatures. For example, engine block 110 and other components can be formed from a metal, a ceramic, steel, aluminum, cast iron, a metallic amalgam or any other material that allows for the desired energy output to be created.

As described above, inner block surface 116 defines cavity 118 within engine block 110. As illustrated in FIG. 1, cavity 118 houses the crankshaft 130, leading and trailing blades 140,150 and a combustion chamber, which will be described in reference to FIG. 2. It should be noted that cavity 118 is illustratively shown as having a spherical shape; however any other functionally compatible shape can be provided. For example, cavity 118 can be cubic, cylindrical, rhomboidal, conical, symmetrically-shaped, asymmetrically-shaped or any other complementary shape which is functionally compatible with the shape of engine block 110.

As further illustrated, engine block 110 can include a combustion generating system 112, which is connected to the engine block. The combustion generating system 112 can supply and ignite an amount of air-fuel composition within the cavity 118. It should be noted that combustion generating system 112 is illustratively shown as a single system but combustion generating system 112 can have multiple sub-systems that are functionally compatible with the engine block 110. By way of example, combustion generating system 112 can include an air-fuel delivery sub-system, a spark generating sub-system, an extension sub-system that extends between the exterior block surface 114 and the inner block surface 116 to the cavity 118, or any other sub-system that is necessary to create the desired energy output. It should also be noted that in FIG. 1 combustion generating system is illustratively shown as having a single access point to cavity 118, but combustion generating system can have any number of functionally compatible access points. For example, in additional embodiments of the present invention, a single system can have a single air-fuel delivery and ignition location, a single system can have multiple air-fuel delivery and ignition locations, and multiple systems can have multiple air-fuel delivery and ignition locations.

As also illustrated in FIG. 1, exhaust port 120 can extend between exterior block surface 114 and inner block surface 116, such that exhaust can escape the cavity 118 via the port 120. It should be noted that exhaust port 120 is illustratively shown as having a symmetrical, cylindrical shape but can be any shape that is functionally compatible with the desired energy output. For example, exhaust port 120 can be rectangular, rhomboidal or conical. Furthermore, exhaust port can be located anywhere along the exterior block surface 114 and inner block surface 116, extending along a vector from axis 132. In additional embodiments of the present invention, combustion port 120 can include a cover affixed to the exterior block surface 114, which opens and closes based on exhaust emitting from the cavity 118.

As further illustrated in FIG. 1, crankshaft 130 can be rotatably fixed within cavity 118 and can be configured to rotate around axis 132. Crankshaft 130 rotates leading and trailing blades 140, 150 around axis 132, acting as a focal point during a combustion event. Crankshaft 130 can be functionally configured to rotate in either a clockwise or counter-clockwise motion around axis 132 depending on the desired energy output. Conversely, crankshaft 130 can also be functionally configured to rotate in both a clockwise and counter-clockwise motion around axis 132. It should be noted that crankshaft 130 is illustratively shown in FIG. 1 as being connected to leading and trailing blades 140, 150 along the entire blade, but crankshaft 130 can be connected to the leading and trailing blades 140, 150 in any functionally compatible attachment approach. For example, crankshaft 130 can be connected to the leading and trailing blades 140, 150 at one point, two points or any number of points along the leading and trailing blades 140, 150 that produces the required amount of energy output.

FIG. 1 also illustrates leading blade 140, connected to crankshaft 130. Leading blade 140 rotates around crankshaft 130 as a result of a directional force created during a combustion event. Leading blade 140 further can include a leading blade edge 142 and a leading blade wall 144. It should be noted that leading blade edge 142 is illustratively shown as being symmetrically arced at edge 142, however edge 142 can have any functionally compatible shape that is complementarily shaped to inner block surface 116. For example, leading blade edge 142 can be uniformly arced, irregularly arced, uniformly straight, or have any uniform or irregular shape that allows leading blade 140 to rotate around crankshaft 130 complementarily to inner block surface 116. It should also be noted leading blade wall 144 is illustratively shown as being flat, but leading blade wall 144 can be any shape that is functionally compatible. For example, leading blade wall 144 can be concave, convex, have portions that are concave, convex, or irregularly shaped in such a manner that allows leading blade wall 144 to rotate around crankshaft 130 complementarily to inner block surface 116.

Leading blade 140 can further include leading blade range of travel 146 which is coaxial to crankshaft 130. Range of travel 146 can be clockwise or counterclockwise. Range of travel 146 can conversely be clockwise and counterclockwise. Furthermore, range of travel 146 can be between zero degrees (0°) and three hundred and sixty degrees (360°).

FIG. 1 also illustrates trailing blade 150, connected to crankshaft 130. Trailing blade 150 rotates around crankshaft 130 as a result of a directional force created during a combustion event. Trailing blade 150 further can include a trailing blade edge 152 and a trailing blade wall 154. It should be noted that trailing blade edge 152 is illustratively shown as being symmetrically arced at edge 152, however edge 152 can have any functionally compatible shape that is complementarily shaped to inner block surface 116. For example, trailing blade edge 152 can be uniformly arced, irregularly arced, uniformly straight, or have any uniform or irregular shape that allows trailing blade 150 to rotate around crankshaft 130 complementarily to inner block surface 116. It should also be noted trailing blade wall 154 is illustratively shown as being flat, but trailing blade wall 154 can be any shape that is functionally compatible. For example, trailing blade wall 154 can be concave, convex, have portions that are concave, convex, or be irregularly shaped in such a manner that allows trailing blade wall 154 to rotate around crankshaft 130 complementarily to inner block surface 116.

Trailing blade 150 can further include trailing blade range of travel 156 which is coaxial to crankshaft 130. Range of travel 156 can be clockwise or counterclockwise. Furthermore, range of travel 156 can be between zero degrees (0°) and three hundred and sixty degrees (360°).

It should also be noted that leading and trailing blades 140, 150 are illustratively shown in FIG. 1 as having the same or similar shape but blades 140, 150 may have any shape that is functionally compatible with inner block surface 116 and cavity 118. For example, the leading and trailing blades 140, 150 can be differently shaped from one another based on the desired energy output to be created. Furthermore, leading and trailing blades 140, 150 are illustratively shown in FIG. 1 to be evenly spaced around the crankshaft, but blades 140, 150 can be placed at any functional spacing around the crankshaft, uniform, irregular or random. Also, FIG. 1 depicts only one leading blade 140 and one trailing blade 150; however there can be multiple leading and trailing blades 140, 150. For example, there can be two, three, four, five or six each of the leading and trailing blades 140, 150, or as many blades as are functionally necessary to create the desired energy output.

Components of the present invention, as illustrated in FIG. 1, can be provided in any desired shape insofar as such shapes are functionally compatible with the present invention. These shapes can include, but are not limited to, straight, angular or arced edges of components, uniform or irregular shapes of components, flat, concave, convex or otherwise irregularly shaped dimensions or part of the dimensions thereof of the components.

Furthermore, components of the present invention as illustrated in FIG. 1 can be formed, constructed or otherwise fabricated from, for example and not in limitation, metals such as iron and aluminum, metallic alloys such as steel, ceramic, composite materials and/or any other such material that can withstand high temperatures and has a high tensile strength.

FIG. 1 illustrates an exemplary combustion engine 100 according to an exemplary embodiment of the present invention, in which combustion engine 100 is designed to convert energy into useful mechanical motion or create a change in position with respect to time. This conversion of energy can also be described as changing the direction or magnitude of a force created by a combustion event.

Figure 2:
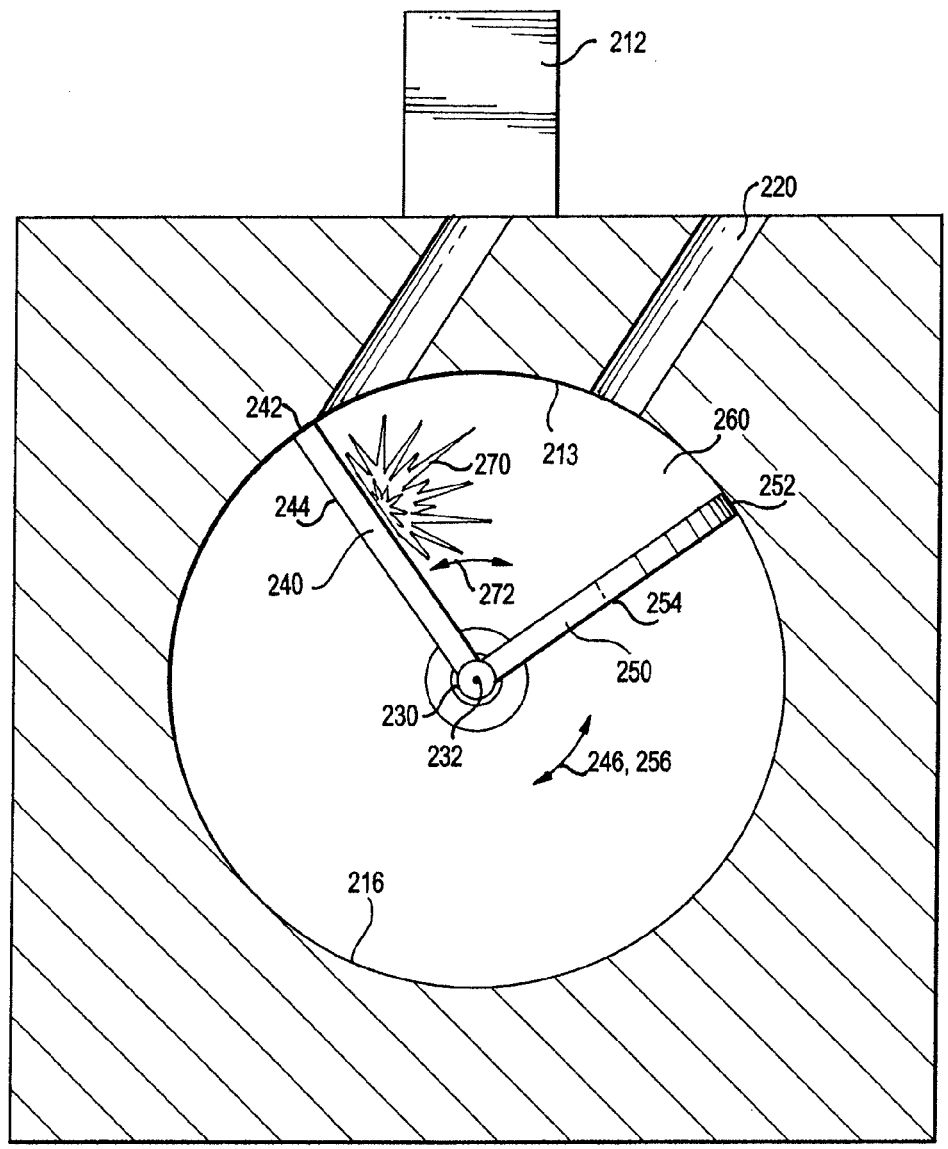
FIG. 2 illustrates an exemplary aspect of the present invention in which a combustion event can occur.

As illustrated in FIG. 2, during an exemplary combustion event, a portion 213 of an inner block surface 216 can be complementarily shaped to leading blade edge 242 and trailing blade edge 252, such that portion 213 of inner block surface 216 is outside ranges of travel 246, 256 by at most six (6) inches. As illustrated in FIG. 2, leading blade wall 244 and trailing blade wall 254 form, in conjunction with portion 213 of the inner block surface 216, a combustion chamber 260.

Combustion chamber 260 acts as an enclosure in which the combustion event is controlled. It should be noted that the combustion chamber 260 is illustratively shown in FIG. 2 to be wedge-shaped but can be any size or shape that is structurally functional with the shape of the portion 213 of the inner block surface 216 and the leading and trailing blade walls 244, 254. For example, the combustion chamber 260, and/or a portion thereof, can be uniformly or irregularly shaped.

In additional exemplary embodiments of the present invention, a plurality of symmetrically opposing combustion chambers can be situated so that a plurality of combustions can occur intermittently, at consistent or random intervals, or continuously in such a manner to assist with balancing of the combustion engine during operation.

In another exemplary aspect of the combustion event, as illustrated in FIG. 2, a combustion generating system 212 can supply and ignite an amount of air fuel composition 270 which can be supplied at a location within the combustion chamber 260 to create a combustion force 272 positioned closer to one of the leading blade wall 244 and the trailing blade wall 254, than the other wall. Combustion force 272 acts to coaxially rotate the leading and trailing blades 240, 250 by increasing the pressure inside the combustion chamber 260 to force the movement of one of the blades 240, 250 away from the combustion force 272. Combustion force 272 can thereafter exhaust from the combustion chamber 260 via exhaust port 220.

It should be noted that combustion force 272 is illustratively shown in FIG. 2 as being located closer to the leading blade wall 244 than the trailing blade wall 254 to further illustrate directional movement, however combustion force 272 can be created at any location within the combustion chamber 260 that is functionally compatible with generating the desired energy output. For example, combustion force 272 can be created closer to either the leading blade wall 244 or the trailing blade wall 254 or both the leading blade wall 244 and the trailing blade wall 254 in a periodic or random rate, where the rate at which the combustion force 272 is created is based on the acceleration or deceleration desired. In additional exemplary embodiments of the present invention (not shown), the air fuel composition 270 can be supplied at any location along portion 213 of the inner block surface 216 and also at any location within combustion chamber 260 which can be reached by combustion generating system 212 and which can allow for creation of combustion force 272 definable by a directional displacement vector.

The directional movements of leading blade 240 and trailing blade 250 are illustratively shown in FIG. 2 by leading blade range of travel 246 and trailing blade range of travel 256. The ranges of travel 246, 256 depict the distance, linear and/or angular, that leading and trailing blades 240, 250 travel while attached to crankshaft 230. Ranges of travel 246, 256 can be, for example, between zero degrees (0°) and three hundred and sixty degrees (360°). Ranges of travel 246, 256 furthermore, can be clockwise or counterclockwise. It should be noted that ranges of travel 246, 256 are illustratively shown in FIG. 2 as being up to 360° in both the clockwise and counterclockwise directions but the ranges of motion, the linear or angular distance that the leading and trailing blades 240, 250 can move based on one or more combustion events, can be limited by a number of factors. For example, the ranges of motion can be limited by the location of the combustion event, the location of the exhaust port, any friction forces created by the distance between leading blade and trailing blade edges 242, 252, any friction forces created by the type of air fuel composition, or any friction forces created by the crankshaft 230.

It should also be noted that leading blade range of travel 246 and trailing blade range of travel 256 will be the same, or at least substantially similar, in both direction and magnitude during a combustion event, as illustratively shown in FIG. 2. However, the leading blade ranges of motion as described above can be different if functionally necessary to create the desired energy output. For example, the ranges of motion can be different based on the location of the combustion event, the location of the exhaust port when a combustion event occurs, any friction forces created by the distance between trailing and leading blade edges 242, 252, any friction forces created by the type of air fuel composition used, or any friction forces created by the crankshaft 230.

The present invention contemplates utilization of various types of fuel for creation of a combustion force, including but are not limited to, gasoline, other hydrocarbons such as diesel and alcohol, and gases such as hydrogen, propane and methane. Additional types of fuel may also include a biomass, such as algae, oil (such as used cooking oil, for example and not in limitation), and/or one of a plant-based fuels. In an exemplary embodiment of the present invention (not shown) a combustion engine can be configured to operate using a single fuel type; however, in additional exemplary embodiments adaptations to components and/or air/fuel mixtures may allow for the combustion engine to operate using a plurality of fuels, whether separately or in combination.

Figure 3:
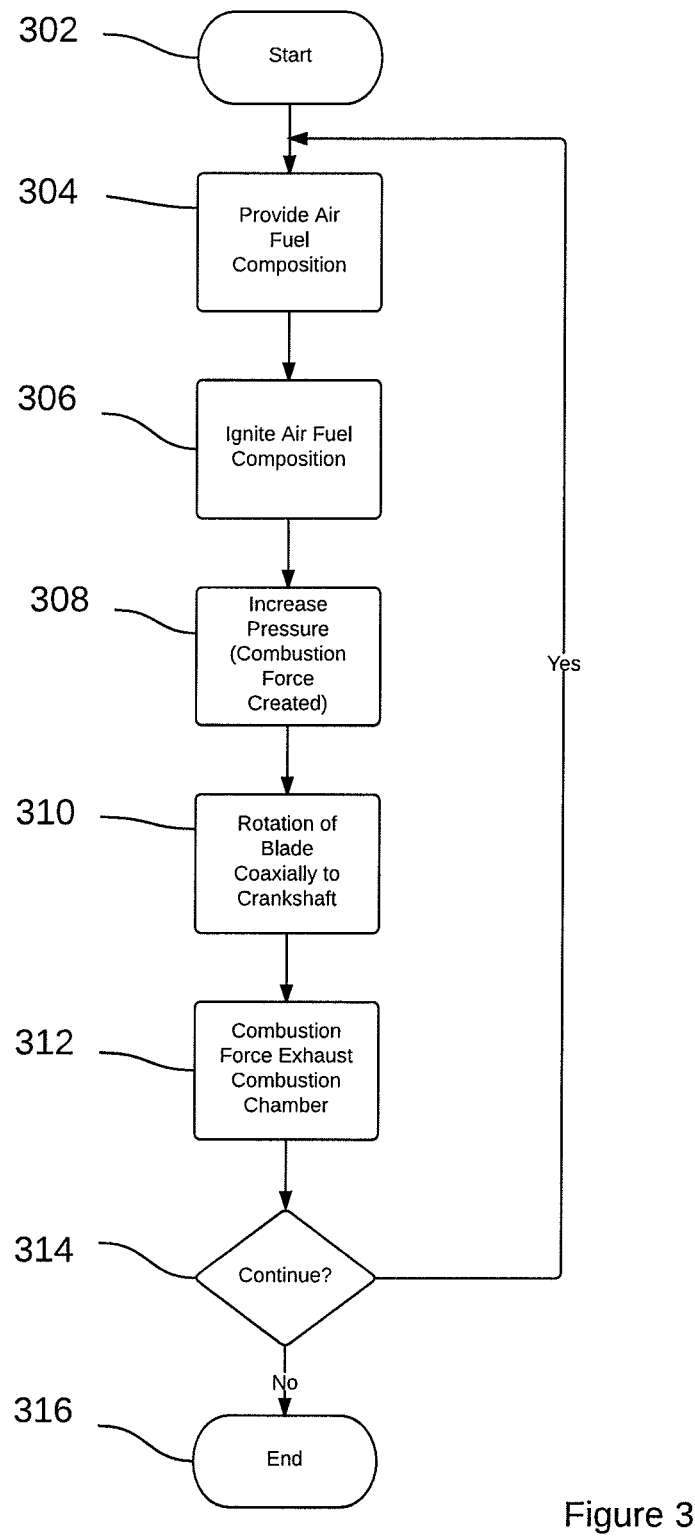
FIG. 3 illustrates an exemplary method of producing energy with the present invention.

FIG. 3 illustrates an exemplary method of producing energy using a combustion engine according to the present invention, converting an air fuel composition into energy by combustion. Combustion is the combination of two substances which results in the production of heat. This heat is caused by the increase of the internal energy of the air fuel composition and translates into an increase in temperature, pressure and volume within a combustion chamber. After the energy creating sequence is initiated at 302, an air fuel composition is provided 304 into a combustion chamber. The location to which the air fuel composition is provided can be, for example, positionally closer to one of a leading blade or trailing blade (as illustrated in FIG. 2); however, the air fuel composition can be provided at any location within the combustion chamber that creates the desired energy output. It should be noted that the air fuel composition can be provided using any functionally compatible method. For example, the air fuel composition can be provided by vacuum, gravity-fed, or any other method which produces the desired output energy.

At 306, the air fuel composition is ignited. The ignition at 306 can, for example, occur simultaneously with injection 304, however it should be noted that ignition 306 can occur at any time that creates the desired combustion force. An increase in pressure 308 occurs thereafter within the combustion chamber as the air fuel composition expands towards an opening in the combustion chamber, for example, one or more exhaust ports.

Movement of a blade at 310 coaxially with a crankshaft, based on the pressure differential, translates into rotational motion of the crankshaft. It should be noted that the location of the created pressure differential can dictate the direction of rotation, for example, clockwise or counterclockwise.

The pressure differential dissipates when the combustion force exhausts 312 the combustion chamber via the combustion port. Following exhaustion 312, the method can be repeated 314 or halted 316 as desired, for example and not in limitation, after a desired energy output is obtained, to conserve air fuel composition, or the amount of air fuel composition remaining.

In another exemplary aspect of the present invention, a method of servicing a combustion engine can involve servicing at least one of an engine block, a crankshaft, a leading blade, a trailing blade, an air fuel delivery sub-system, a spark generating sub-system and any other engine part. Servicing can include, but is not limited to, tuning, general maintenance, repair, modification, adjustment, and/or replacement, in whole or in part, of any part of a combustion engine according to the present invention.

It will be apparent to one of ordinary skill in the art that the manner of making and using the claimed invention has been adequately disclosed in the above-written description of the exemplary embodiments and aspects. It should be understood, however, that the invention is not necessarily limited to the specific embodiments, aspects, arrangement, and components shown and described above, but may be susceptible to numerous variations within the scope of the invention. Moreover, particular exemplary features described herein in conjunction with specific embodiments and/or aspects of the present invention are to be construed as applicable to any embodiment described within, enabled hereby, or apparent herefrom. Thus, the specification and drawings are to be regarded in a broad, illustrative, and enabling sense, rather than a restrictive one.

Further, it will be understood that the above description of the embodiments of the present invention are susceptible to various modifications, changes, and adaptations, and the same are intended to be comprehended within the meaning and range of equivalents of the appended claims.

Therefore, I claim:

1. A combustion engine, comprising:
an engine block having an exterior block surface and an inner block surface, the inner block surface defining a cavity within said engine block;
an exhaust port extending between the inner block surface and the exterior block surface;
a crankshaft rotatably fixed within the cavity and configured to rotate around an axis;
a leading blade, connected to said crankshaft, and having one of a leading blade arced edge and a leading blade straight edge, a leading blade wall, and a leading blade range of travel that is coaxial with said crankshaft;
a trailing blade, connected to said crankshaft, and having one of a trailing blade arced edge and a trailing blade straight edge, a trailing blade wall, and a trailing blade range of travel that is coaxial with said crankshaft;
wherein during a combustion event, said leading and trailing blades simultaneously revolve with said crankshaft, a portion of the inner block surface includes said exhaust port, is complementarily shaped to the leading and trailing blade edges, and is outside both ranges of travel, the leading and trailing blade walls and the portion form a combustion chamber, and an ignited amount of air fuel composition within the combustion chamber creates a combustion force positioned closer to one of the leading blade wall and the trailing blade wall than the other of the leading blade wall and the trailing blade wall, such that the combustion force, forces the one of the leading blade wall and the trailing blade wall to rotate away from the combustion force to rotate said crankshaft around the axis, and exhausts from the combustion chamber via said exhaust port.

2. The combustion engine of claim 1, wherein said engine block is formed from a rigid material.

3. The combustion engine of claim 2, wherein said crankshaft is formed of one of the rigid material and another rigid material.

4. The combustion engine of claim 1, wherein the cavity is symmetrically shaped along the axis.

5. The combustion engine of claim 1, wherein the cavity is asymmetrically shaped.

6. The combustion engine of claim 1, wherein the cavity is cylindrically shaped along the axis.

7. The combustion engine of claim 1, wherein the cavity surface is smooth.

8. The combustion engine of claim 1, wherein said exhaust port extends along a vector from the axis.

9. The combustion engine of claim 1, wherein said crankshaft is configured to rotate around the axis in at least one of a clockwise direction and a counterclockwise direction.

10. The combustion engine of claim 1, wherein said leading blade includes a leading blade straight edge, and the portion of the inner block surface is further complementarily shaped to the leading blade straight edge.

11. The combustion engine of claim 1, wherein said leading blade includes a leading blade arced edge, and the leading blade arced edge is uniformly arced.

12. The combustion engine of claim 1, wherein at least a portion of the leading blade arced edge is irregularly arced.

13. The combustion engine of claim 1, wherein at least a portion of the leading blade wall is flat.

14. The combustion engine of claim 1, wherein at least a portion of the leading blade wall is concave.

15. The combustion engine of claim 1, wherein at least a portion of the leading blade wall is convex.

16. The combustion engine of claim 1, wherein at least a portion of the leading blade wall is irregularly shaped.

17. The combustion engine of claim 1, wherein the trailing blade includes a trailing blade straight edge, and the portion of the inner block surface is further complementarily shaped to the trailing blade straight edge.

18. The combustion engine of claim 1, wherein the leading blade includes a leading blade straight edge and said trailing blade includes a trailing blade straight edge.

19. The combustion engine of claim 1, wherein the leading blade includes a leading blade arced edge and said trailing blade includes a trailing blade arced edge.

20. The combustion engine of claim 1, wherein at least a portion of the trailing blade arced edge is uniformly arced.

21. The combustion engine of claim 1, wherein at least a portion of the trailing blade arced edge is irregularly arced.

22. The combustion engine of claim 1, wherein at least a portion of the trailing blade wall is flat.

23. The combustion engine of claim 1, wherein at least a portion of the trailing blade wall is concave.

24. The combustion engine of claim 1, wherein at least a portion of the trailing blade wall is convex.

25. The combustion engine of claim 1, wherein at least a portion of the trailing blade wall is irregularly shaped.

26. The combustion engine of claim 1, wherein the leading blade range of travel and the trailing blade range of travel are equal.

27. The combustion engine of claim 1, wherein the combustion force is positioned closer to the leading blade wall than the trailing blade wall.

28. The combustion engine of claim 1, wherein the combustion force is positioned closer to the trailing blade wall than the leading blade wall.

29. A method of servicing the combustion engine of claim 1, comprising the step of:
    replacing, at least in part, at least one of the engine block, the crankshaft, the leading blade, and the trailing blade.

* * * * *